(12) United States Patent
Matsuno

(10) Patent No.: US 9,026,324 B2
(45) Date of Patent: May 5, 2015

(54) CONTROL SYSTEM FOR FOUR-WHEEL DRIVE VEHICLE

(71) Applicant: Fuji Jukogyo Kabushiki Kaisha, Tokyo (JP)

(72) Inventor: Koji Matsuno, Tokyo (JP)

(73) Assignee: Fuji Jokogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/462,297

(22) Filed: Aug. 18, 2014

(65) Prior Publication Data

US 2015/0073670 A1 Mar. 12, 2015

(30) Foreign Application Priority Data

Sep. 10, 2013 (JP) ................................. 2013-187549

(51) Int. Cl.

| G06F 7/00 | (2006.01) |
|---|---|
| G06F 17/00 | (2006.01) |
| G06F 19/00 | (2011.01) |
| B60K 23/08 | (2006.01) |
| B60W 10/18 | (2012.01) |
| B60W 10/119 | (2012.01) |

(52) U.S. Cl.
CPC ................ *B60K 23/08* (2013.01); *B60W 10/18* (2013.01); *B60W 10/119* (2013.01)

(58) Field of Classification Search
USPC ........... 701/53, 58, 67, 69, 70, 79, 81, 83, 89; 477/70, 71, 170, 171, 172, 174, 182
See application file for complete search history.

(56) References Cited

U.S. PATENT DOCUMENTS

| 2006/0052908 A1* | 3/2006 | Matsumoto et al. ............... 701/1 |
|---|---|---|
| 2007/0096556 A1* | 5/2007 | Kokubo et al. ................ 303/155 |
| 2010/0094519 A1 | 4/2010 | Quehenberger et al. |
| 2010/0168977 A1* | 7/2010 | Matsuno ......................... 701/74 |
| 2013/0260959 A1 | 10/2013 | Quehenberger et al. |

FOREIGN PATENT DOCUMENTS

JP  2010-100280 A  5/2010

* cited by examiner

*Primary Examiner* — Justin Holmes
(74) *Attorney, Agent, or Firm* — McGinn IP Law Group, PLLC

(57) ABSTRACT

A deceleration indication value is set so as to prevent a collision between the vehicle and an obstacle on the basis of front side information or to prevent traffic lane deviation, and automatic braking is performed. When automatic braking is performed, a transfer clutch is coupled, a deceleration generated by synchronization of a main drive shaft and a propeller shaft is calculated, the deceleration indication value G is corrected based on the deceleration and a brake liquid pressure corresponding to a corrected deceleration indication value is applied to a brake drive unit.

8 Claims, 4 Drawing Sheets

CONTROL SYSTEM FOR FOUR-WHEEL DRIVE VEHICLE

CROSS-REFERENCE TO RELATED APPLICATIONS

The present application claims priority from Japanese Patent Application No. 2013-187549 filed on Sep. 10, 2013, the entire contents of which are hereby incorporated by reference.

BACKGROUND

1. Technical Field

The present invention relates to a control system for a four-wheel drive vehicle that can freely stop a propeller shaft on which an automatic brake device is installed which causes automatic braking to be performed in response to an obstacle or a sharply curved road in front of the vehicle.

2. Related Art

Heretofore, in a four-wheel drive vehicle in which a driving force is transmitted through a propeller shaft, which can be freely stopped, from a main drive shaft to an auxiliary shaft, in order to reduce a travelling resistance, it has been necessary to firstly synchronize the propeller shaft with the wheels by applying a torque to the propeller shaft when a two-wheel drive operation, in which the propeller shaft is stopped, must be switched to a four-wheel drive operation while the vehicle is traveling. Since the rotational synchronization torque applied to the propeller shaft acts as a brake torque on a drive system, when the synchronization torque becomes large, the vehicle is subject to unpleasant and unwanted deceleration and shock (back-and-forth jerking). If an attempt is made to suppress generation of the brake torque, the two-wheel drive operation cannot be rapidly switched to the four-wheel drive operation. As a result, there is a great problem in a trade-off between reduction of the braking torque and reduction of a switching period. A technology in a four-wheel drive vehicle for switching a two-wheel drive operation to a four-wheel drive operation is disclosed in, for instance, Japanese Unexamined Patent Application Publication (JP-A) No. 2010-100280. The vehicle having such a technology includes a first clutch that transmits a variable part of a driving torque to an auxiliary accelerator of the vehicle and a second clutch that deactivates a propeller shaft provided between the first and second clutches when the first clutch is uncoupled. The second clutch is coupled in accordance with a wheel slip detected in a main accelerator and the propeller shaft in the deactivated state is accelerated before coupling of the second clutch.

However, in the four-wheel drive vehicle disclosed in JP-A No. 2010-100280, even if smooth rotational synchronization is realized for the propeller shaft, an operation in which the propeller shaft is accelerated by consuming a vehicle travelling (moving) energy or an additional fuel results in an energy loss that runs counter to an aim of increasing fuel efficiency by adopting a propeller shaft that can freely stop.

In current vehicles, various automatic braking systems have been developed and put into use in order to enhance safety and reduce the burden on the driver. Such automatic braking systems are actively adopted in four-wheel drive vehicles. In a four-wheel drive vehicle that can freely stop a propeller shaft as described above, if it is possible for the automatic braking system to absorb an energy necessary to synchronize the main drive shaft and the propeller shaft from a kinetic energy of the vehicle to be consumed and then convert and utilize the energy, it is preferable to effectively utilize the kinetic energy of the vehicle to be consumed in some form. In circumstances where automatic braking is performed in order to prevent a collision between a vehicle and an obstacle or to prevent the vehicle from deviating from a traffic lane, there is high possibility of tire grip reaching its limit. Accordingly, it would be effective in view of safety to switch the two-wheel drive operation to the four-wheel drive operation in advance. Furthermore, if an operation of a main brake is reduced in consideration of the deceleration applied to the vehicle by rotational synchronization, it will be possible to reduce a heat load acting on the brake.

SUMMARY OF THE INVENTION

Accordingly, in view of the above circumstances, it is an object of the present invention to provide a control system for a four-wheel drive vehicle in which a propeller shaft on which an automatic brake control device is installed, which causes automatic braking to be performed in response to an obstacle or a sharply curved road in front of the vehicle can be freely stopped, the automatic brake control device can absorb an energy necessary to synchronize the main drive shaft and the propeller shaft from an energy to be consumed and effectively convert and utilize the energy, a two-wheel drive operation can be switched to a four-wheel drive operation in a state in which prediction is performed to prevent a collision with an obstacle or traffic lane deviation so as to enhance safety, and further a heat load of a main brake caused by actuation of the automatic brake control device can be reduced.

In an aspect of a control system for a four-wheel drive vehicle of the invention, a main drive shaft of one of a front shaft and a rear shaft transmits a driving force through a driving force transmission shaft to an auxiliary drive shaft of the other of the front shaft and the rear shaft, a first clutch is provided between the main drive shaft and the driving force transmission shaft, a second clutch is provided between the driving force transmission shaft and the auxiliary drive shaft, and the driving force transmission shaft can be stopped freely. The control system includes: a front side information recognition unit that recognizes information regarding a road in front of the vehicle; an automatic brake control unit that sets a deceleration indication value on the basis of front side information from the front side information recognition unit and causes automatic braking to be performed; a driving force control unit that controls coupling and release operations of the first and second clutches; and a deceleration correction unit that calculates a deceleration caused by rotational synchronization of the main drive shaft and the driving force transmission shaft and corrects the deceleration indication value of the automatic brake control unit by using the calculated deceleration. The driving force control unit couples the first clutch when the automatic brake control unit causes automatic braking to be performed on the basis of the front side information in the case where the vehicle is not in a state of a four-wheel drive operation in which the first and second clutches are coupled.

DETAILED DESCRIPTION

Figure 1:
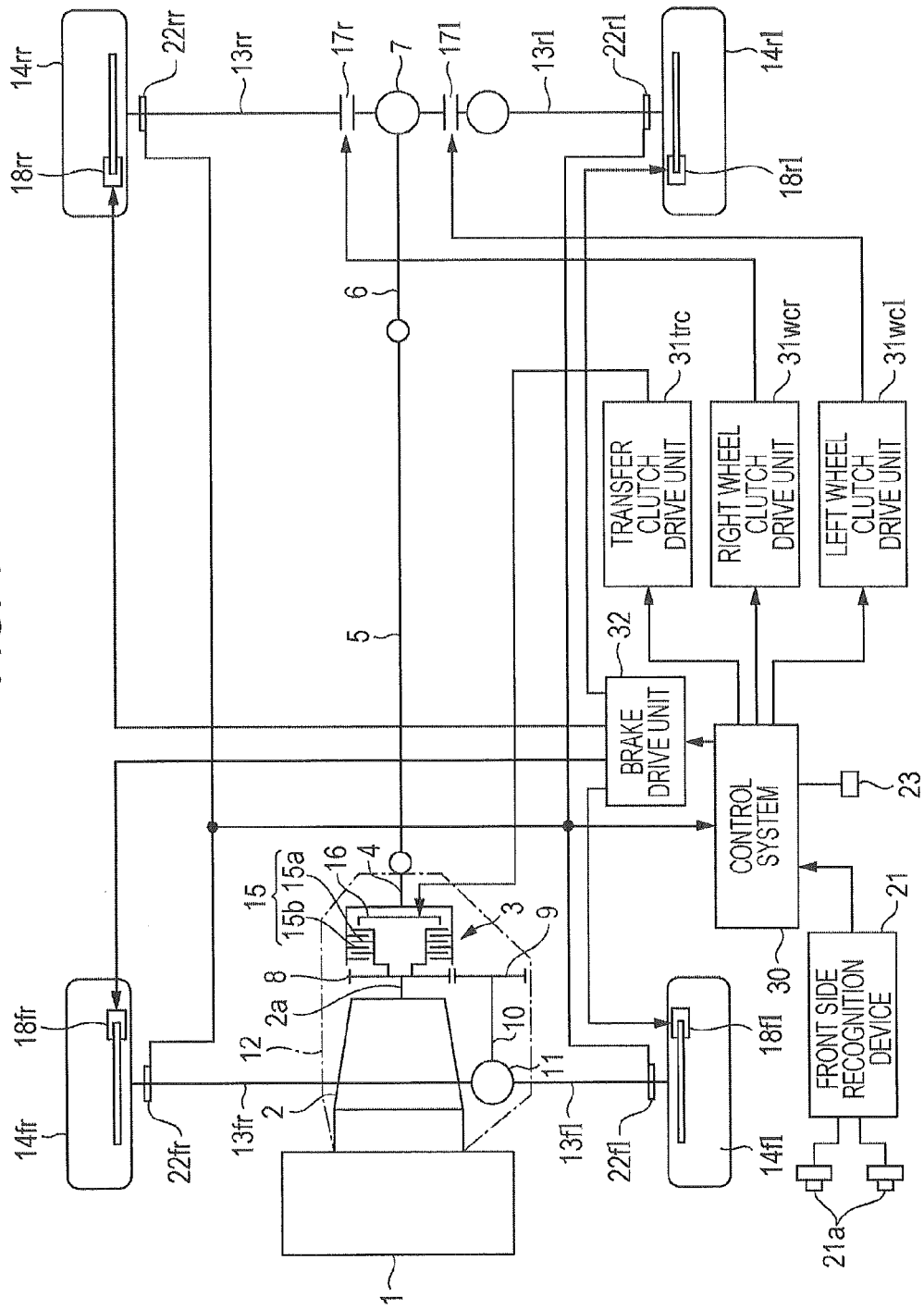
FIG. 1 is a block diagram of a vehicle according to an example of the invention.

Referring now to the drawings, an example of the invention will be described below.

FIG. 1 is a block diagram of a vehicle according to an example of the invention. In FIG. 1, an engine 1 is located in a front compartment of the vehicle. A driving force from the engine 1 is transmitted from an automatic transmission 2 (including a torque converter and the like) behind the engine 1 through a transmission output shaft 2a to a transfer 3.

The driving force transmitted to the transfer 3 is applied through a rear drive shaft 4, a propeller shaft 5, and a drive bevel pinion shaft 6 to a rear wheel final reduction gear 7. Also the driving force from the engine 1 is applied through a reduction drive gear 8, a reduction driven gear 9 and, a front drive shaft 10 to be used as a drive bevel pinion shaft to a front wheel final reduction gear 11. The automatic transmission 2, the transfer 3, the front wheel final reduction gear 11, and the like are together contained in a casing 12.

The driving force applied to the rear wheel final reduction gear 7 is transmitted through a rear wheel left drive shaft 13rl to a left rear wheel 14rl and further through a rear wheel right drive shaft 13rr to a right rear wheel 14rr.

Also, the driving force applied to the front wheel final reduction gear 11 is transmitted through a front wheel left drive shaft 13fl to a left front wheel 14fl and further through a front wheel right drive shaft 13fr to a right front wheel 14fr.

The transfer 3 includes a wet multiple disc clutch 15 (a transfer clutch) and a piston 16 which applies a coupling force to the transfer clutch 15 variably. The wet multiple disc clutch 15 is a variable torque transmission capacity clutch in which drive plates 15a provided at a side of the reduction drive gear 8 and driven plates 15b provided at a side of the rear drive shaft 4 are stacked alternately.

Also, the rear wheel final reduction gear 7 does not have a differential mechanism. The rear wheel left drive shaft 13rl is provided with a left wheel clutch 17l which transmits a driving force to the rear left drive shaft 13rl in a connectable and disconnectable manner. On the other hand, the rear wheel right drive shaft 13rr is provided with a right wheel clutch 17r which transmits a driving force to the rear right drive shaft 13rr in a connectable and disconnectable manner. These left and right wheel clutches 17l and 17r are synchronized with each other by using a known number of revolutions.

Accordingly, in the example of a four-wheel drive vehicle, when the transfer clutch 15 and the left and right wheel clutches 17l and 17r are released together, the propeller shaft 5 is stopped. The front left wheel drive shaft 13fl and the front right wheel drive shaft 13fr constitute a main drive shaft. The rear left wheel drive shaft 13rl and the rear right wheel drive shaft 13rr constitute an auxiliary drive shaft. The propeller shaft 5 functions as a driving force transmission shaft. The transfer clutch 15 functions as a first clutch. The left and right wheel clutches 17l and 17r function as a second clutch. When the transfer clutch 15 is controlled by a pressing force of the piston 16, a rotational torque is applied to the propeller shaft 5 and rotational synchronization of the propeller shaft 5 and the main drive shaft is controlled. Distribution of front and rear driving forces of the vehicle is controlled.

The pressing force of the piston 16 is exerted by a transfer clutch drive unit 31trc composed of a hydraulic circuit having a plurality of solenoid valves and the like. A control signal (a transfer clutch torque Tm) that drives the transfer clutch drive unit 31trc is generated by a control system 30 described later. The left and right wheel clutches 17l and 17r are actuated by left and right wheel clutch drive units 31wcl and 31wcr each composed of a hydraulic circuit including a plurality of solenoid valves and the like. Control signals that drive the left and right wheel clutch drive units 31wcl and 31wcr are generated by the control system 30 described later.

On the other hand, a master cylinder connected to a brake pedal (not illustrated) which is operated by a driver is connected to a brake drive unit 32. When the driver operates (presses) the brake pedal, a brake pressure is introduced by the master cylinder through the brake drive unit 32 into the respective wheel cylinders of four wheels 14fl, 14fr, 14rl, and 14rr (a left front wheel cylinder 18fl, a right front wheel cylinder 18fr, a left rear wheel cylinder 18rl, and a right rear wheel cylinder 18rr). Then, the braking forces are applied to the four wheels.

The brake drive unit 32 is a hydraulic unit including a pressure source, a pressure reducing valve, a pressure increasing valve, and the like. The brake drive unit 32 can introduce the brake pressure into each of the wheel cylinders 18fl, 18fr, 18rl, and 18rr, respectively in response to input signals from the control system 30 and the like.

Next, the control system 30 will be described below.

The control system 30 is connected to a front side recognition device 21, wheel speed sensors (a left front wheel speed sensor 22fl, a right front wheel speed sensor 22fr, a left rear wheel speed sensor 22rl, and a left rear wheel speed sensor 22rr) of the respective wheels 14fl, 14fr, 14rl, and 14rr, a propeller shaft rotational speed sensor 23, and other sensors (not illustrated) such as a steering angle sensor, a yaw rate sensor, an accelerator pedal sensor, and a brake pedal sensor, and other units such as an engine control unit (ECU), and a transmission control unit (TCU), and the like. The control system 30 receives front side information such as three-dimensional object data and white line data in front of the vehicle, and other information such as wheel speeds of the respective wheels 14fl, 14fr, 14rl, and 14rr (a left front wheel speed $\omega fl$, a right front wheel speed $\omega fr$, a left rear wheel speed $\omega rl$, and a right rear wheel speed $\omega rr$), a propeller shaft rotational speed $\omega d$, a steering angle, a yaw rate, an accelerator pedal pressing amount, a brake pedal pressing amount, an engine speed, an air suction amount, a transmission gear ratio, and the like. In the example of the invention, an average rotational speed of the left front wheel speed $\omega fl$ and the right front wheel speed $\omega fr$ is adopted as a rotational speed $\omega m$ of a main drive shaft while an average rotational speed of the left rear wheel speed $\omega rl$ and the right rear wheel speed $\omega rr$ is adopted as a rotational speed $\omega s$ of an auxiliary drive shaft.

The front side recognition device 21 recognizes information regarding the road in front of the vehicle on the basis of an image taken by, for instance, a stereo camera unit 21a. The stereo camera unit 21a includes a pair of right and left cameras that use a solid image pick-up device made of, for instance, a charge coupled device (CCD) or the like. The pair of CCD cameras are attached to a front part of a ceiling in a vehicle cabin and are separated from each other by a certain distance on the ceiling. The pair of CCD cameras take a stereo image of an outside target from different points of view and output image information.

The front side recognition device 21 receives image information from the stereo camera unit 21a and speed information (for instance, an average speed of speeds of four wheels) from the vehicle. The front side recognition device 21 recognizes front side information including three-dimensional object data, white line data, and the like regarding objects in front of the vehicle on the basis of the image information from the stereo camera unit 21a and estimates a vehicle travelling road on the basis of the recognized information. The front side recognition device 21 checks whether or not any three-dimensional object such as an obstacle, a preceding vehicle, or the like exists on the vehicle travelling road. If there is any three-dimensional object on the vehicle travelling road, the front side recognition device 21 recognizes the nearest object as an object (an obstacle) for which control is to be performed.

For instance, the front side recognition device 21 processes image information from the stereo camera unit 21a as follows. Firstly, distance information is generated by a pair of stereo images taken by the stereo camera unit 21a in a travelling direction of the vehicle. Secondly, the device 21 performs well known grouping processing from the distance information. Thirdly, the device 21 compares the distance information dealt with by the grouping processing with predetermined three-dimensional road configuration data, three-dimensional object data, or the like and the device 21 extracts data such as white line data, side wall data of a guardrail or a curbstone extending along a road, and three-dimensional object such as a vehicle. These recognized data are respectively assigned with individual ID numbers and are stored in a memory. The front side recognition device 21 estimates the vehicle travelling road on the basis of white line data, side wall data, or the like and detects an obstacle or a three-dimensional object such as a preceding vehicle which exists in front on the vehicle traveling road, as a target (an obstacle) for automatic braking control. Fourthly, if any obstacle is detected, a relative distance d between the vehicle 1 and the obstacle, a moving speed Vf of the obstacle (=rate-of-change of the relative distance d+the vehicle speed V), a deceleration af of the obstacle (=a differentiated value of the moving speed Vf of the obstacle), and the like are calculated. Thus, in the example of the invention, the front side recognition device 21 together with the stereo camera unit 21a is provided as a front side recognition unit.

In accordance with the respective input signals described above, the control system 30 sets a deceleration indication value G that prevents a collision between the vehicle and the obstacle on the basis of front information such as that regarding a front obstacle, a sharply curved road, or the like or that prevents the vehicle from deviating from a traffic lane (the vehicle travelling lane) and the control system 30 causes automatic braking to be performed. When automatic braking is to be performed, the transfer clutch 15 is coupled, a deceleration ΔGω generated by rotational synchronization of the main drive shaft and the propeller shaft 5 is calculated, the deceleration indication value G is corrected by the deceleration ΔGω so as to obtain a corrected value Gc, a brake liquid pressure Pb is applied to the brake drive unit 32 on the basis of the corrected deceleration indicating value Gc. In the case where the vehicle is not performing the four-wheel drive operation and a given period of time has elapsed since the vehicle passed an automatic brake target such as an obstacle or a curved road, all of the clutches 15, 17l, and 17r are released.

Figure 2:
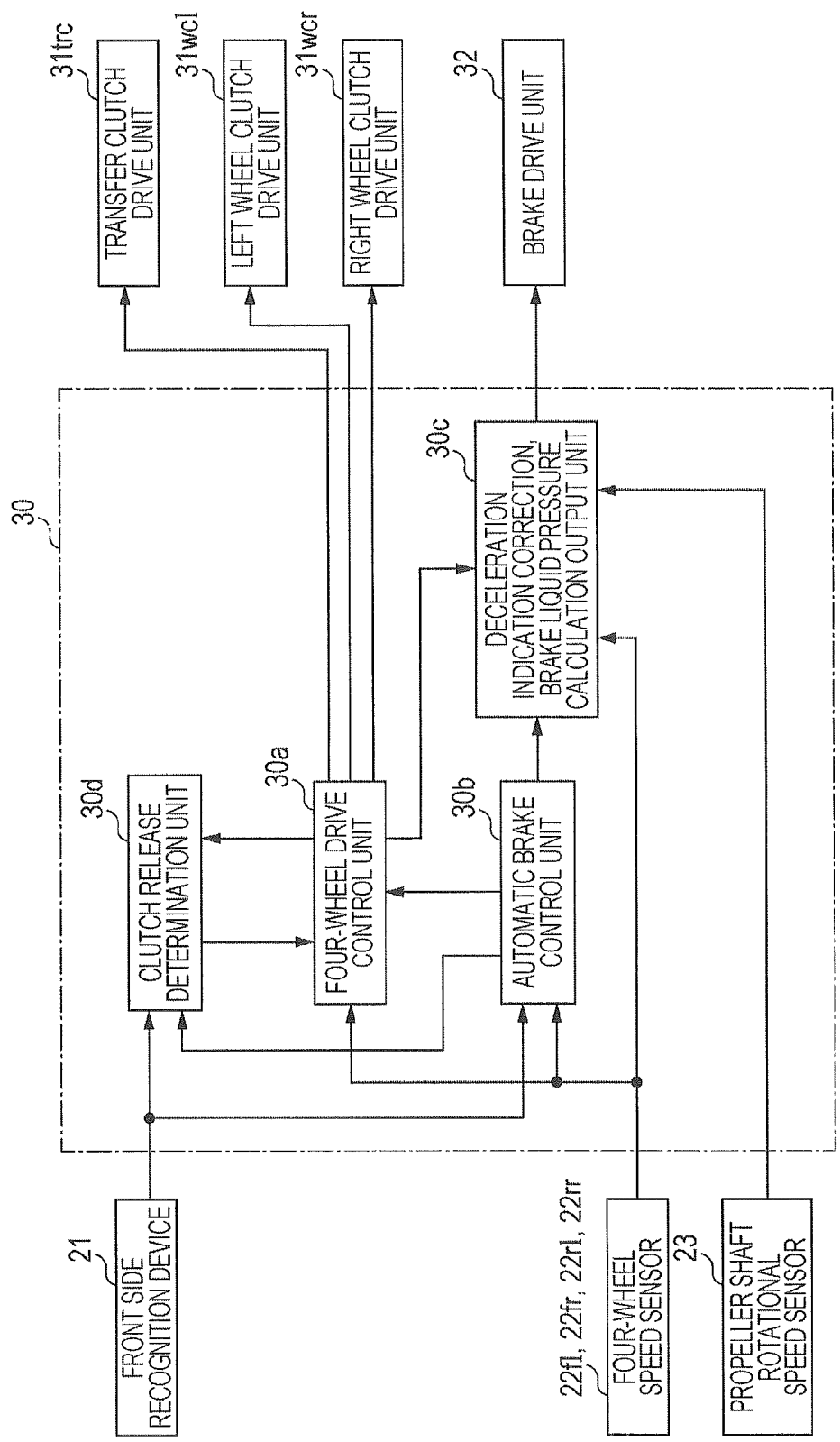
FIG. 2 is a block diagram of a control system according to the example of the invention.

As illustrated in FIG. 2, the control system 30 mainly includes a four-wheel drive control unit 30a, an automatic brake control unit 30b, a deceleration indication correction, brake liquid pressure calculation output unit 30c, and a clutch release determination unit 30d.

The four-wheel drive control unit 30a receives respective wheel speeds ωfl, ωfr, ωrl, and ωrr from the four-wheel speed sensors 22fl, 22fr, 22rl, and 22rr. Also, the four-wheel drive control unit 30a receives a steering angle from a steering angle sensor (not illustrated), receives a yaw rate from a yaw rate sensor (not illustrated), receives an engine rotational speed and an air-suction amount from the ECU (not illustrated), receives a transmission gear ratio from the TCU (not illustrated), and further receives from the automatic brake control unit 30b a signal indicating whether or not automatic braking is to be performed on the basis of the front side information (obstacle or sharply curved road information), and receives signals for releasing all clutches 15, 17l, and 17r from the clutch release determination unit 30d.

The four-wheel drive control unit 30a calculates, for instance, a yaw moment as a target yaw moment in order to perform usual four-wheel drive control. The yaw moment suppresses an inclination of understeer of the vehicle. In the case where an average wheel speed ((ωfl+θωfr)/2) of right and left wheels on the front shaft exceeds a wheel speed of an outer rotating wheel on the rear shaft, a wheel clutch at a side of the outer rotating wheel on the rear shaft is coupled when the target yaw moment described above is applied to the vehicle. At the same time, a wheel clutch at a side of an inner rotating wheel is released and a coupling force of the transfer clutch 15 is controlled on the basis of the target yaw moment.

When the propeller shaft 5 is stopped and the vehicle travels not under the four-wheel drive control but under the two-wheel drive control, and when the four-wheel drive control unit 30a receives a signal that causes automatic braking to be performed from the automatic brake control unit 30b on the basis of the front side information (obstacle or sharply curved information regarding a road), the four-wheel drive control unit 30a couples the transfer clutch 15.

Furthermore, in the case where the control system 30 is not performing the four-wheel drive control, the four-wheel drive control unit 30a releases all clutches 15, 17l, and 17r in response to an indication signal received from the clutch release determination unit 30d to release all clutches 15, 17l, and 17r.

Also, the four-wheel drive control unit 30a outputs to the clutch release determination unit 30d a signal which indicates an operating state of the four-wheel drive control in addition to a signal (a coupling signal or release signal) to the respective clutches 15, 17l, and 17r. The four-wheel drive control unit 30a outputs a coupling torque value Tm of the transfer clutch 15 to the deceleration indication correction, brake liquid pressure calculation output unit 30c. Thus, the four-wheel drive control unit 30a acts as a control unit of driving force.

The automatic brake control unit 30b receives from the front side recognition device 21 the front side information including the three-dimensional object data, the white line data, and the like for objects in front of the vehicle, receives from the four-wheel speed sensors 22fl, 22fr, 22rl, and 22rr the respective wheel speeds ωfl, ωfr, ωrl, and ωrr, receives a steering angle from the steering angle sensor (not illustrated), receives the yaw rate from the yaw rate sensor (not illustrated), and receives the accelerator pedal pressing amount from the accelerator pedal (not illustrated) The automatic brake control unit 30b in the example of the invention has a function of preventing a collision between the vehicle and the obstacle and a function of preventing deviation from a traffic lane so as to suitably control the vehicle speed on a sharply curved road.

Figure 5:
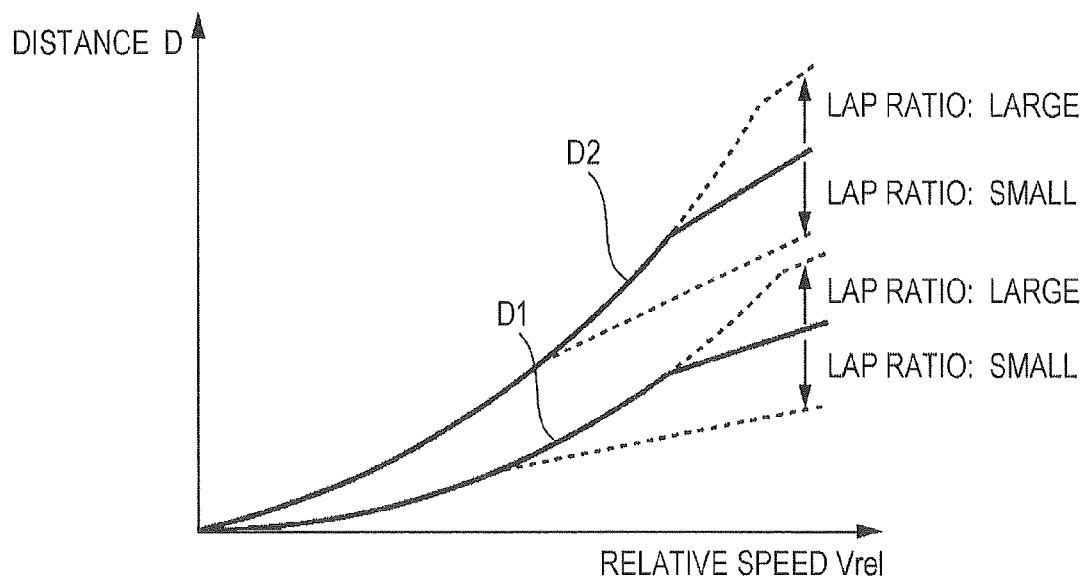
FIG. 5 is a three dimensional map according to the example of the invention, illustrating lap ratios in a relationship between a relative speed between the vehicle and an object for which control is to be performed and a brake intervention distance.

The automatic brake control unit 30b performs the function of preventing a collision between the vehicle and an obstacle by utilizing, for instance, a method disclosed in Japanese Unexamined Patent Application Publication No. 2009-262701. In more detail, first and second brake intervention distances D1 and D2 with respect to the obstacle are set with reference to, for instance, a previously prepared map illustrated in FIG. 5.

The first brake intervention distance D1 is a limit distance (a collision avoidance limit distance) at which collision avoidance between the vehicle and the obstacle is difficult even using a braking or steering operation. For instance, the first brake intervention distance D1 is set in advance on the basis of an experiment, a simulation, or the like. The collision avoidance limit distance D1 is changed in accordance with, for instance, the relative speed Vrel between the vehicle and the obstacle and is further changed in accordance with the relative speed Vrel between the vehicle and the obstacle and a lap ratio R1. The second brake intervention distance D2 is set to be a distance longer than the first intervention distance D1 by a given length. In more detail, the second brake intervention distance D2 is set in advance on the basis of, for instance, an experiment, a simulation, or the like and is set to be a distance that extends to the vehicle by predetermined distance longer than the collision avoidance limit distance D1 on the basis of the relative speed Vrel.

When the relative distance d between the vehicle and the obstacle becomes less than or equal to the first brake intervention distance D1, the automatic brake control unit 30b performs brake control to be realized by intervention of automatic braking (hereinafter referred to "regular brake control"). In the regular brake control, the automatic brake control unit 30b sets in advance fixed values including, for instance, a deceleration (a target deceleration Gt) to be generated by automatic braking, and an amount of change of deceleration (a deceleration change amount ΔG1) to be allowed when generating the target deceleration Gt. The automatic brake control unit 30b calculates the deceleration indication value G on the basis of the fixed values. The automatic brake control unit 30b outputs the calculated deceleration indication value G to the deceleration indication correction, brake liquid pressure calculation output unit 30c.

The automatic brake control unit 30b performs damping control by intervention of automatic braking (hereinafter referred to "extension brake control") prior to the regular brake control, when the relative distance d between the vehicle and the obstacle is larger than the first brake intervention distance D1 and smaller than or equal to the second brake intervention distance D2. In the extension brake control, the automatic brake control unit 30b sets, for instance, the target deceleration Gt and the deceleration change amount ΔG1 to be variable. The automatic brake control unit 30b calculates the deceleration indication value G on the basis of Gt and ΔG1. The automatic brake control unit 30b outputs the calculated deceleration indication value G to the deceleration indication correction, brake liquid pressure calculation output unit 30c.

In the function of preventing traffic lane derivation of the automatic brake control unit 30b, for instance, a center line between right and left white lines is set to be a target course, a cornering radius ρ around the target course is calculated in sequence by quadratic approximation or the like, a part of the target course is extracted when the cornering radius ρ becomes smaller than the predetermined threshold value, the cornering radius ρ in the approximated portion out of the extracted part of the target course is set to be a control target, and the limit speed Vlim is determined by reference to a map including a cornering radius ρ and a limit speed Vlim which are set in advance on the basis of an experiment, a calculation, or the like. In the case where a present speed V of the vehicle is higher than the limit speed Vlim, the deceleration indication value G necessary to reduce the present speed of the vehicle to the limit speed Vlim is calculated. The automatic brake control unit 30b outputs the calculated deceleration indication value G to the deceleration indication correction, brake liquid pressure calculation output unit 30c.

Also, the automatic brake control unit 30b outputs an operating state of the automatic brake control described above to the four-wheel drive control unit 30a and outputs to the clutch release determination unit 30d the ID numbers assigned to the obstacle and the curved road that are the targets in order to perform automatic braking. Thus, the automatic brake control unit 30b is provided as an automatic brake control apparatus.

The deceleration indication correction, brake liquid pressure calculation output unit 30c receives the respective wheel speed ωfl, ωfr, ωrl, and ωrr from the four-wheel speed sensors 22fl, 22fr, 22rl, and 22rr, receives the propeller shaft rotational speed ωd from the propeller shaft rotational speed sensor 23, receives the clutch coupling torque Tm of the transfer clutch 15 from the four-wheel drive control unit 30a, and receives the calculated deceleration indication value G from the automatic brake control unit 30b.

A rotational speed difference Δωmd (=(ωm·Gf−ωd:Gf is a final gear ratio) between those of the main driving shaft and the propeller shaft 5 is calculated. An absolute value |Δωmd| of the rotational speed difference and the threshold value Sd set in advance on the basis of an experiment, a calculation, or the like are compared with each other. If the absolute value |Δωmd| of the rotational speed difference is larger than the threshold value Sd, synchronization of the main drive shaft and the propeller shaft 5 is not completed and the coupling torque Tm of the transfer clutch 15 is set as a rotational synchronization torque Tsm. In the case where the absolute value |Δωmd| of the rotational speed difference is smaller than or equal to the threshold value Sd, synchronization of the main drive shaft and the propeller shaft 5 is determined to be completed and a synchronization torque Tsm of the transfer clutch 15 is set to be zero (0).

The vehicle deceleration ΔGω based on rotational synchronization in which the main drive shaft and the propeller shaft 5 rotates synchronously is calculated by, for instance, the following equation (1) by utilizing the rotational synchronization torque Tsm.

$$\Delta G\omega = (Tsm \cdot Gf/Rt) \cdot (1/m) \qquad (1)$$

Here, Rt is a diameter of a tire and m is a mass of the vehicle.

For instance, the deceleration indication value G is corrected by the following equation (2) and a brake liquid pressure Pb is calculated by utilizing the corrected deceleration indication value Gc and the following equation (3). The brake liquid pressure Pb is applied to the brake drive unit 32.

$$Gc = G - \Delta G\omega \qquad (2)$$

$$Pb = Cb \cdot Gc \qquad (3)$$

Here, Cb is a constant determined by brake specifications.

Thus, the deceleration indication correction, brake liquid pressure calculation output unit 30c is provided as a deceleration correction unit.

The clutch release determination unit 30d receives front side information including three-dimensional object data, white line data and the like regarding objects in front of the vehicle from the front side recognition device 21, receives an operation state of the four-wheel drive control from the four-wheel drive control unit 30a, and from the automatic brake control unit 30b receives ID numbers or the like assigned to the control target including the obstacle and the curved road that are targets in which the automatic brake control unit 30b performs automatic braking. In the case where the vehicle is not in a four-wheel drive state and a given period of time has elapsed since the vehicle passed the control target (the obstacle) that caused operation of automatic braking, the clutch release determination unit 30d outputs signals that release all clutches 15, 17l, and 17r to the four-wheel drive control unit 30a.

Figure 3:
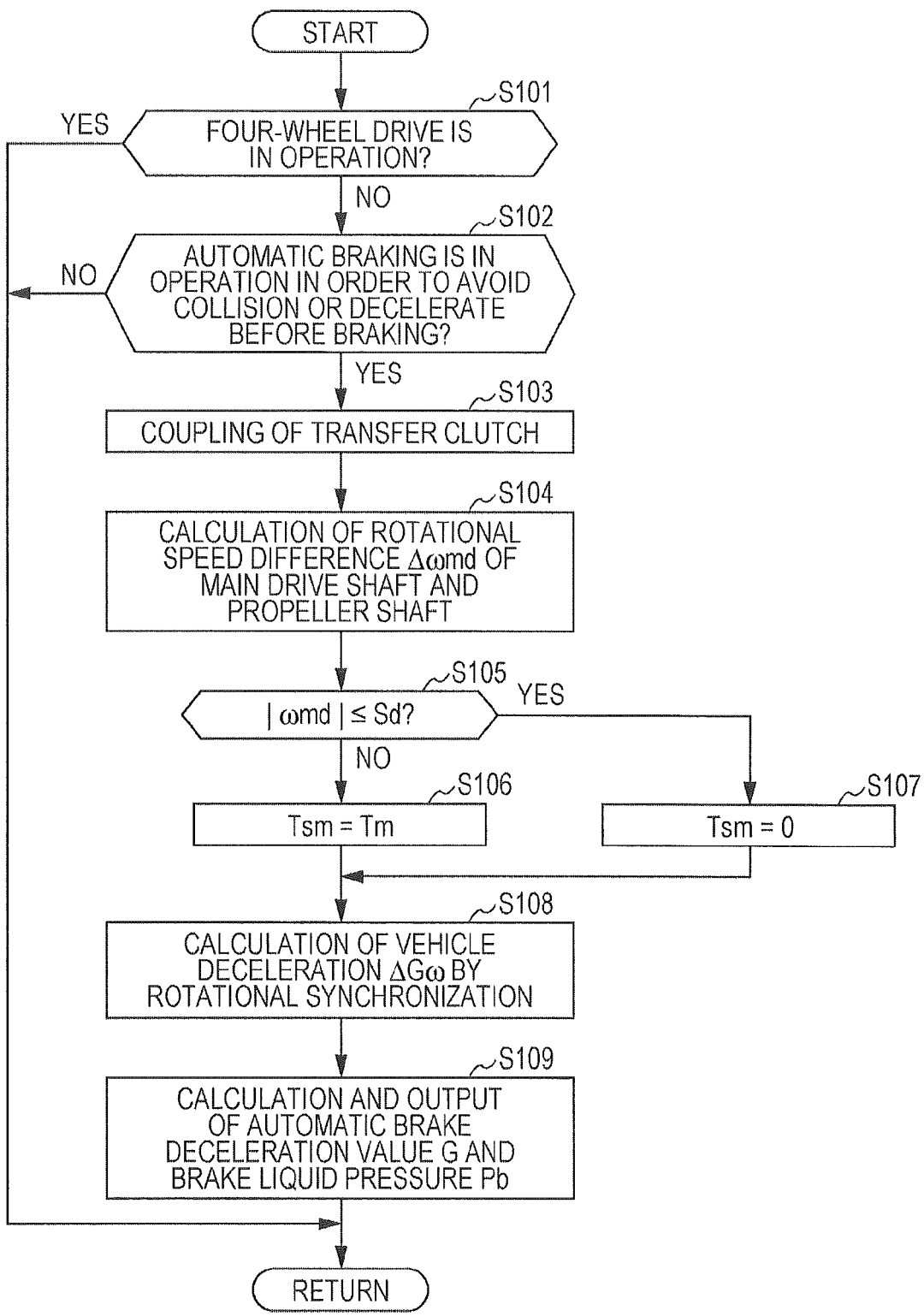
FIG. 3 is a control flow chart executed in the control system according to the example of the invention.

Next, a control operation performed in the control system 30 described above will be described by referring to a flow chart illustrated in FIG. 3.

Firstly, in a step S101 (hereinafter, the term "step" is abbreviated to "S"), the four-wheel drive control unit 30a determines whether or not the vehicle is performing a four-wheel drive operation. In the case where the four-wheel drive operation is being performed, the rest of the routine is skipped. In the case where the four-wheel drive operation is not being performed, the routine advances to S102.

Secondly, in S102, the automatic brake control unit 30b determines whether or not automatic braking is to be performed to avoid a collision or to decelerate ahead of a curved road. In the case where automatic braking is not to be performed, the rest of the routine is skipped. In the case where automatic braking is to be performed, the routine advances to S103. The four-wheel drive control unit 30a couples the transfer clutch 15.

Thereafter, the routine advances to S104. The deceleration indication correction, brake liquid pressure calculation output unit 30c calculates the rotational speed difference $\Delta\omega md$ (=$\omega m \cdot Gf - \omega d$) between those of the main driving shaft and the propeller shaft 5.

Next, the routine advances to S105. The absolute value $|\Delta\omega md|$ of the rotational speed difference is compared with the threshold value Sd set in advance on the basis of the experiment, the calculation, or the like. If the absolute value $|\Delta\omega md|$ is larger than the threshold value Sd ($|\Delta\omega md|>Sd$), the control system 30 determines that synchronization of the main drive shaft and the propeller shaft 5 is not completed. The routine advances to S106. The coupling torque Tm of the transfer clutch 15 is set as the rotational synchronization torque Tsm.

In contrast, if the absolute value $|\Delta\omega md|$ is smaller than or equal to the threshold value Sd ($|\Delta\omega md|\leq Sd$), the control system 30 determines that synchronization of the main drive shaft and the propeller shaft 5 is completed. The routine advances to S107. The rotational synchronization torque Tsm is set to be zero (0).

After setting the rotational synchronization torque Tsm in S106 or S107, the routine advances to S108. The vehicle deceleration $\Delta G\omega$ obtained by the rotational synchronization is calculated using the equation (1) described above.

The routine advances to S109. The deceleration indication value G is corrected using the equation (2) described above. The brake liquid pressure Pb is calculated by utilizing the corrected deceleration indication value Gc and the equation (3) described above. The brake liquid pressure Pb is applied to the brake drive unit 32. The control system 30 ends the program.

Figure 4:
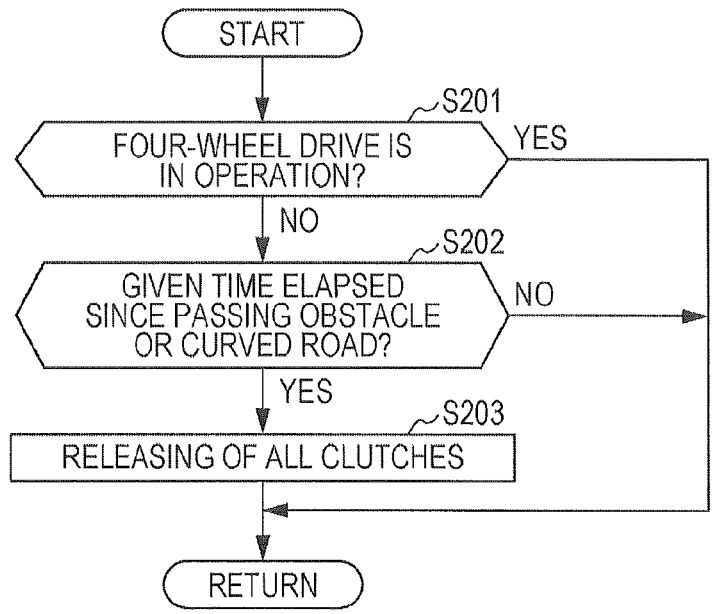
FIG. 4 is a process flow chart executed in a clutch release determination unit according to the example of the invention.

Next, a program in which the clutch release determination unit 30d described above performs a clutch release determination process will be described by referring to a flow chart illustrated in FIG. 4.

Firstly, in S201, the four-wheel drive control unit 30a determines whether or not the vehicle is performing the four-wheel drive operation. In the case where the four-wheel drive operation is being performed, the rest of the routine is skipped. In the case where the four-wheel drive operation is not being performed, the routine advances to S202.

In S202, the automatic brake control unit 30b determines whether or not a given period of time has elapsed since the vehicle passed the control target such as an obstacle or a curved road.

As a result of the determination, if the given period of time has not elapsed since the vehicle passed the obstacle or the curved road, the rest of the routine is skipped. If the given period of time has elapsed, the routine advances to S203. In S203, it is determined that automatic braking is not to be performed for the obstacle or the curved road, signals that cause all clutches 15, 17l, and 17r to be released are applied to the four-wheel drive control unit 30a, and the program is ended.

According to the example of the invention, in order to prevent a collision between the vehicle and the obstacle on the basis of the front side information including information regarding a front obstacle, a front curved road, or the like, or in order to prevent the vehicle from deviating from the traffic lane, the deceleration indication value G is set and automatic braking is performed. When automatic braking is performed, the transfer clutch 15 is coupled and the deceleration $\Delta G\omega$ generated by the rotational synchronization of the main drive shaft and the propeller shaft 5 is calculated, the deceleration indication value G is corrected by the deceleration $\Delta G\omega$, and the brake liquid pressure Pb based on the corrected deceleration indication value Gc is applied to the brake drive unit 32. In the case where the vehicle is not in the four-wheel drive state and the given period of time has elapsed since the vehicle passed the brake control target such as the obstacle or the curved road, all clutches 15, 17l, and 17r are released. As a result, in the four-wheel drive vehicle that can freely stop the propeller shaft on which the automatic brake control device is installed so as to perform automatic braking in response to the obstacle or the curved road in front of the vehicle, the automatic brake control device can absorb an energy necessary to synchronize the main shaft and the propeller shaft from an energy to be consumed and can then effectively convert and utilize the energy. Also, in a state in which prevention of a collision with an obstacle or prevention of deviation from a traffic lane is predicted, it is possible to shift to the four-wheel drive operation in advance, thereby enhancing safety. Furthermore, it is possible to reduce a heat load of the main brake caused by the automatic brake control device.

Although the stereo camera unit 21a is utilized as the front side information recognition unit in the example of the invention, the front side information recognition unit may be, for instance, a monocular camera, a radar, a laser, or a combination of them. A shape of a road may be map information obtained by a navigation system. Furthermore, although the automatic brake control unit 30b has both of the function of preventing a collision with the obstacle and the traffic lane deviation prevention function that suitably suppresses a speed on a curved road in the example of the invention, the unit 30b may have just one of the functions. Also, although the right and left clutches 17r and 17l are provided as the second clutch in the example, the mechanism is not limited to this. For instance, the drive bevel pinion shaft 6 may be provided with a clutch that intermittently transmits a driving force from the propeller shaft 5 to the drive bevel pinion shaft 6 and this clutch may be used as the second clutch.

The invention claimed is:

1. A control system for a four-wheel drive vehicle in which a main drive shaft of either one of a front shaft and a rear shaft transmits a driving force through a driving force transmission shaft to an auxiliary drive shaft of the other of the front shaft and the rear shaft, a first clutch is provided between the main drive shaft and the driving force transmission shaft, a second clutch is provided between the driving force transmission shaft and the auxiliary drive shaft, and the driving force transmission shaft can be stopped freely, the control system comprising:

a front side information recognition unit that recognizes information regarding a road in front of the vehicle;

an automatic brake control unit that sets a deceleration indication value on the basis of front side information from the front side information recognition unit and causes automatic braking to be performed;

a driving force control unit that controls coupling and release operations of the first and second clutches; and a deceleration correction unit that calculates a deceleration caused by rotational synchronization of the main drive shaft and the driving force transmission shaft and corrects the deceleration indication value of the automatic brake control unit by using the calculated deceleration;

wherein the driving force control unit couples the first clutch when the automatic brake control unit causes automatic braking to be performed on the basis of the front side information in the case where the vehicle is not in a state of a four-wheel drive operation.

2. The control system for a four-wheel drive vehicle according to claim 1, wherein in the case where the vehicle is not in the state of the four-wheel drive operation and in the case where the vehicle has normally passed a target against which the automatic brake control unit causes automatic braking to be performed, the driving force control unit is adapted to release the first and second clutches.

3. The control system for a four-wheel drive vehicle according to claim 1, wherein the deceleration correction unit calculates a deceleration generated in a state of rotational synchronization of the main drive shaft and the driving force transmission shaft and in a state of rotational synchronization of the main drive shaft and the driving force transmission shaft in accordance with a coupling torque of the first clutch.

4. The control system for a four-wheel drive vehicle according to claim 2, wherein the deceleration correction unit calculates a deceleration generated in a state of rotational synchronization of the main drive shaft and the driving force transmission shaft and in a state of rotational synchronization of the main drive shaft and the driving force transmission shaft in accordance with a coupling torque of the first clutch.

5. The control system for a four-wheel drive vehicle according to claim 1, wherein the automatic brake control unit causes automatic braking to be performed in response to at least one of a front side obstacle and a front side curved road.

6. The control system for a four-wheel drive vehicle according to claim 2, wherein the automatic brake control unit causes automatic braking to be performed in response to at least one of a front side obstacle and a front side curved road.

7. The control system for a four-wheel drive vehicle according to claim 3, wherein the automatic brake control unit causes automatic braking to be performed in response to at least one of a front side obstacle and a front side curved road.

8. The control system for a four-wheel drive vehicle according to claim 4, wherein the automatic brake control unit causes automatic braking to be performed in response to at least one of a front side obstacle and a front side curved road.

* * * * *